March 11, 1969   P. BREIDT, JR., ET AL   3,432,588
METHOD FOR THE PREPARATION OF A FILAMENTARY REINFORCED RESINOUS
ARTICLE HAVING IMPROVED SURFACE CHARACTERISTICS
Filed Dec. 23, 1964
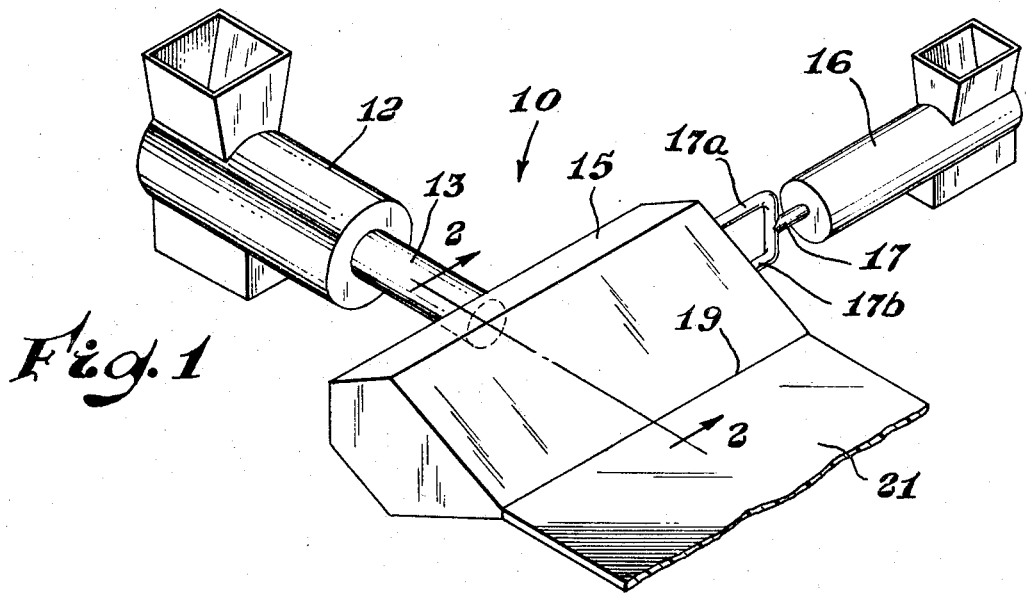
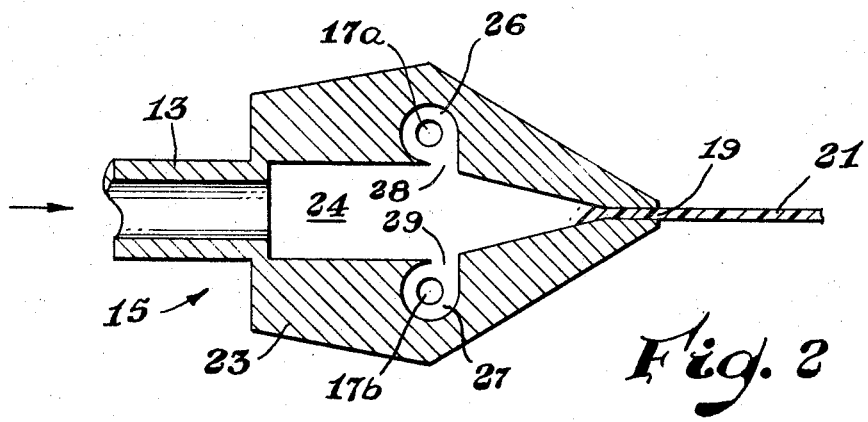
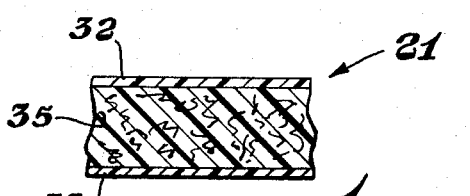
INVENTORS
Peter Breidt, Jr.
Lloyd E. Lefevre
BY
AGENT
ATTORNEY United States Patent Office 3,432,588
Patented Mar. 11, 1969

3,432,588
METHOD FOR THE PREPARATION OF A FILAMENTARY REINFORCED RESINOUS ARTICLE HAVING IMPROVED SURFACE CHARACTERISTICS
Peter Breidt, Jr., Midland, and Lloyd E. Lefevre, Bay City, Mich., assignors to The Dow Chemical Company, Midland, Mich., a corporation of Delaware
Filed Dec. 23, 1964, Ser. No. 420,527
U.S. Cl. 264—171
Int. Cl. B29f 3/10
5 Claims

ABSTRACT OF THE DISCLOSURE

Fiber reinforced plastics are provided with a smooth surface by simultaneously extruding a core of reinforced plastic and a surface layer of nonreinforced plastic.

---

This invention relates to a method for the preparation of a thermoplastic synthetic resinous sheet. It more particularly relates to an improved method of fabricating sheet articles containing filamentary reinforcing embedded in a resinous matrix.

In many applications, it is desirable to employ thermoplastic resinous materials having a filamentary reinforcing agent therein such as, for example, glass fibers and the like. Many shaped articles are prepared by impregnating a glass fiber mat with thermoplastic resinous material, forming the mat to the desired shape, adding sufficient thermoplastic resinous material to provide a finished article having the desired surface. Many filamentary reinforced thermoplastic resinous materials are prepared by extruding the mixture of chopped glass fibers and a thermoplastic resin to a desired sheet-like form. However, such articles generally are not satisfactory for applications which require a smooth finish such as table tops, decorative facings and the like. Oftentimes such reinforced thermoplastic resinous compositions contain from about 10 to about 40–45 weight percent of glass fibers, the percentage being based on the total weight of the resin and the glass fiber. The extruded or molded articles from such compositions generally require extensive surface treatment before the smooth, glossy surface is obtained.

It is an object of this invention to provide an improved method of preparing filamentary reinforced thermoplastic resinous sheet.

A further object of this invention is to provide a thermoplastic resin containing filamentary reinforcing having an improved surface finish.

Another object of the invention is to provide an improved single operation process for the production of a synthetic resinous thermoplastic sheet containing a fiber reinforcing material therein.

These benefits and other advantages in accordance with the present invention are readily achieved by passing a heat plastified resin containing a filamentary reinforcing agent into a restraining configuration, forcing heat plastified material from the configuration while simultaneously forcing into the configuration a substantially nonreinforced second thermoplastic resinous material adjacent to discharge restraining portions of the configuration, and generally encapsulating the reinforced thermoplastic material and discharging the composite material from the configuration.

Further features, benefits and advantages of the method of the invention will become more apparent when taken in connection with the drawing wherein:

FIGURE 1 is a simplified schematic representation of an apparatus particularly adapted to practice the method of the invention;

FIGURE 2 is a sectional view of the die of the apparatus of FIGURE 1 taken along the line 2—2;

FIGURE 3 is a sectional view of the product of the apparatus of FIGURE 1.

In FIGURE 1 there is illustrated an apparatus for use in the practice of the method of the invention generally designated by the reference numeral 10. The apparatus 10 comprises in cooperative combination a first extruder 12 adapted to deliver a stream of a fiber reinforced thermoplastic resinous material through a conduit 13 to a die 15. A second extruder 16 delivers a stream of a substantially nonreinforced thermoplastic resinous material to a conduit 17 which divides into two branches 17a and 17b, which are in operative communication with the die 15. The die 15 has a generally slot-like extrusion orifice 19. A smooth surface composite thermoplastic resinous filament reinforced sheet 21 issues from the orifice 19 of the die 15 and is subsequently cooled below its thermoplastic temperature.

In FIGURE 2 there is illustrated a schematic sectional view of a portion of the die 15 of the apparatus 10 of FIGURE 1. The die 15 comprises a die body 23 having defined therein a major internal cavity 24 in communication with the conduit 13 of the extruder 12. The body 23 defines minor internal cavities 26 and 27 in full communication with the major internal cavity 24 by passageways 28 and 29, respectively. Minor passageways 26 and 27 in length are generally coextensive with the major dimension of the major cavity 24. The minor cavity 26 is in operative communication with the conduit or branch 17a from the extruder 16 whereas the minor cavity 27 is in operative communication with the branch or conduit 17b from the extruder 16. Thus, when a heat plastified filamentary reinforced thermoplastic resinous composition is forced through the conduit 13 into the major cavity 24 and a nonreinforced material is forced into the minor cavities 26 and 27 through the conduits or branches 17a and 17b, the nonreinforced material passes into the major cavity 24 through the passageways 28 and 29, effectively spacing the filamentary reinforced composition from the internal walls of the die body 23 disposed between the passageways 28 and 29 and the orifice 19. As the die is particularly adapted to permit streamline flow of the thermoplastic resinous material the individual layers maintained their identity and a smooth surfaced product results.

FIGURE 3 depicts a sectional view of the sheet 21 of FIGURES 1 and 2 illustrating a first layer of nonreinforced thermoplastic resinous material 32, a second layer of nonreinforced thermoplastic resinous material 33 firmly adhered to a central core of filamentary reinforced thermoplastic resinous material 35.

The method of the invention may be practiced with any thermoplastic resinous material which is heat formable and benefits from the incorporation of filamentary reinforcing material.

Typical resinous materials which may be utilized include the alkenyl aromatic resins typified by polystyrene, styrene copolymers, blends and graft copolymers of styrene and rubber and the like. The invention is readily practiced utilizing polyvinyl chloride, vinylidene chloride copolymers, such as are generally known as saran; superpolyamides, such as nylon 66 (a condensation product of hexamethylene diamine and adipic acid); the polyolefins including polyethylene, polypropylene and resinous copolymers thereof, ethyl cellulose, cellulose acetate, rubbers both natural and synthetic including polybutadiene, polyisoprene including the chlorinated derivatives, mixtures thereof, and the like.

A wide variety of filamentary reinforcing agents may be utilized including certain thermopalstic materials when utilized with other resinous materials which have a significantly lower heat-forming temperature than does the reinforcing material. Particularly advantageous and beneficial are the thermoplastic resinous compositions utilizing filamentary glass or Fiberglas as a reinforcing medium.

Beneficially when filament reinforced thermoplastic resinous material is prepared in accordance with the method of the present invention, substantially higher extrusion rates are achieved when a composite sheet is extruded rather than when a single reinforced sheet of the filamentary reinforced material is extruded.

Further, the conditions of extrusion for the filamentary reinforced material become much less critical of temperature, rate, pressure and the like, whereas the conditions for extrusion of the nonreinforced material are essentially those required for its extrusion when the reinforced material is not present within the die. Generally, for many applications the nonreinforced material has a composition similar or identical to the thermoplastic resinous material in the filamentary reinforced layer. Such conditions usually assure maximum adhesion of the surface or finished layer to the article. However, for many applications it is oftentimes desirable to utilize a lower cost resinous material in the filament reinforced layer. Thus, the filament reinforced layer can provide the desired physical properties while the outer layers provide the desired chemical resistance or similar surface characteristics. As is obvious from FIGURE 1, as desired, diverse materials may be fed into the minor cavities 26 and 27 and opposite sides of the sheets may be provided with an integral skin of diverse materials. The relative thickness of such a skin is readily controlled by the relative rate of feed of heat plastified material through the conduits 17a and 17b. This is readily accomplished utilizing separate extruders or valves or similar flow restrictors in these conduits.

By way of further illustration, an apparatus substantially as shown in FIGURES 1 and 2 delivers 80 pounds per hour of a mixture of 31 parts by weight of quarter inch long glass fibers dispersed in polystyrene at a temperature of about 120° centigrade. A copolymer of about 72 percent styrene and 28 percent by weight acrylonitrile is fed at a rate of 8 pounds per hour from the extruder 16 to the passageways 17a and 17b at a temperature of about 135° centigrade. The product obtained is a composite sheet having high gloss and is cooled to ambient temperature (about 25° C.). The feed from the extruder 16 is stopped. The resultant sheet has a rough surface. The extrusion temperature is varied from 107° centigrade to 220° centigrade and the feed rate varied from 68 to 19 pounds per hour. No conditions are found which provide a smooth sheet comparable to the composite sheet.

The foregoing experiment is repeated wtih the exception that polypropylene having a melt index of 12 is employed and the material from the extruder 16 is a polyethylene having a melt index of 2. The feed rate of the reinforced composition is 97 pounds per hour and of the polyethylene is 4.2 pounds per hour.

In a manner similar to the foregoing the following laminates are prepared which contain in the center layer from about 10 to about 45 parts by weight of glass fiber, wherein the first named component is an outer layer, the second named component is the filamentary reinforced layer and, in cases where a third named component exists, is a diverse outer layer on an opopsite face to the first named outer layer: copolymer of 68 parts of styrene to 32 parts by weight of methyl methacrylate; polyvinylchloride containing 20 weight percent dioctyl phthalate, copolymer of 85 parts by weight of vinylidene chloride and 15 parts by weight of vinyl chloride; nylon 66 (a condensation product of hexamethylenediamine and adipic acid) and a copolymer of 73 parts of styrene and 27 parts of acrylonitrile; ethyl cellulose, cellulose acetate, and the like.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method of preparing a smooth surfaced filamentary reinforced sheet comprising providing a heat plastified stream of a thermoplastic resinous material admixed with a filamentary reinforcing agent, passing the heat plastified resin into a restraining configuration, forcing the heat plastified material from the configuration while simultaneously forcing into the configuration a substantially nonreinforced second heat plastified thermoplastic resinous material adjacent the discharged portions of the configuration and generally encapsulating the reinforced thermoplastic resinous material and discharging a heat plastified composite material from the configuration.

2. The method of claim 1 wherein the filamentary reinforced thermoplastic resinous material contains glass fibers in a proportion of from about 5–45 percent by weight.

3. The method of claim 1 including the step of cooling the composite sheet below its thermoplastic temperature.

4. The method of claim 1 wherein the first thermoplastic resinous material is a polystyrene.

5. The method of claim 4 wherein the second thermoplastic resinous material is a styrene polymer.

References Cited
UNITED STATES PATENTS

| | | | |
|---|---|---|---|
| 2,815,308 | 12/1957 | Robinson et al. | 264—171 |
| 3,164,563 | 1/1965 | Maxwell et al. | 260—37 |
| 3,229,012 | 1/1966 | Garner | 264—174 |
| 3,274,646 | 9/1966 | Krystof | 18—13 |
| 3,277,225 | 10/1966 | Heard | 264—174 |
| 3,022,210 | 2/1962 | Philipps | 264—174 |

FOREIGN PATENTS 1,309,717 10/1962 France.

ROBERT F. WHITE, *Primary Examiner.*

G. AUVILLE, *Assistant Examiner.*